United States Patent [19]

Martone et al.

[11] 4,276,164
[45] Jun. 30, 1981

[54] EFFLUENT TREATMENT SYSTEM

[75] Inventors: Leonard P. Martone, Worcester Rd., Barre, Mass. 01005; Ronald L. Lavigne, Petersham, Mass.

[73] Assignee: Leonard P. Martone, Barre, Mass.

[21] Appl. No.: 108,418

[22] Filed: Dec. 31, 1979

Related U.S. Application Data

[63] Continuation of Ser. No. 936,824, Aug. 25, 1978, abandoned.

[51] Int. Cl.³ .............................................. C02F 9/00
[52] U.S. Cl. ................................................... 210/170
[58] Field of Search ................. 210/170; 137/236 R; 405/38, 40, 50, 51

[56] References Cited

U.S. PATENT DOCUMENTS

| 2,382,010 | 8/1945 | Hodges | 210/2 |
| 3,385,786 | 5/1968 | Klock | 210/12 |
| 3,705,851 | 12/1972 | Brauer | 210/1 |
| 3,817,858 | 6/1974 | Yost | 210/14 |
| 3,897,334 | 7/1975 | Murphy | 210/15 |
| 3,919,848 | 11/1975 | Sullivan | 210/170 X |

Primary Examiner—Thomas G. Wyse
Attorney, Agent, or Firm—Norman S. Blodgett; Gerry A. Glodgett

[57] ABSTRACT

A system for a method of treating effluent from refuse in a landfill which includes a water-impermeable refuse basin, a catch basin, and a lagooning system. Leachate is conveyed from the refuse basin to the catch basin and then to the lagooning system. The leachate is treated in the lagooning system in at least two stages; the first stage consists primarily of oxidation by aeration and the second stage consists primarily of oxidation by biological means.

12 Claims, 4 Drawing Figures

EFFLUENT TREATMENT SYSTEM

This is a continuation of application Ser. No. 936,824, filed Aug. 25, 1978, now abandoned.

BACKGROUND OF THE INVENTION

The invention is directed generally to treatment of effluent from landfilled refuse and, more specifically, for treating the leachate from such refuse.

In recent years, a growing number of communities have turned from the traditional open community dump for refuse disposal to the so-called "sanitary landfill" system. Although most state codes require a four-foot buffer zone between refuse and the high water table, experience has shown that landfills normally produce a highly-potent fluid waste or leachate, but this leachate has a propensity for traveling considerable distances away from its point of origin. This has created a considerable pollution problem which cannot be eliminated by increasing the degree of separation between the refuse and the high water table.

It has been proposed to use impermeable liners to catch and treat leachate and to treat the leachate as conventional systems. Since the leachate is much more toxic than conventional raw sewage, many communities are reluctant to add the leachate to the local waste water treatment plant. This toxicity is due, in part, to the presence of heavy metals. It is also due to the biochemical oxygen demand which is a value obtained from a five day test in a manner well-known in the art and which is expressed as "BOD5 mg/L" (milligrams per liter). The BOD5 of raw sewage is approximately 300 mg/L while that of refuse leachate may be as high as 30,000 mg/L. Since conventional waste water treatment plants are not designed to treat effluent of such high toxicity, normal operation would be upset and water contamination of local streams and ground water would result if one attempted to purify it in such a treatment plant.

Also, the expense of collecting and transporting the refuse leachate from the landfill site to the local waste water treatment plant could prove to be prohibitive.

In addition to the toxicity of heavy metals, it appears that landfill leachates pose a serious bacteriological and viral threat to ground and surface waters. If leachates can be contained within the soil, and are forced to flow through a semi-permeable stratum, considerable screening or absorption can occur, but all too often they have been found to break out at the face of the landfill area and to flow over land to adjacent surface waters. If these surface waters are used for potable water supplies or contact recreation, there may be a need for increased attention to the micro-biological health implication associated with leachates. These and other difficulties experienced with the prior art systems have been obviated by the present invention.

It is, therefore, an outstanding object of the invention to provide an on-site system and method of treating leachate.

Another object of the invention is the provision of a system for treating highly toxic leachates from a landfill and reducing them to a safe, acceptable level for release into the environment.

A further object of the present invention is the provision of a treatment system for leachates which is efficient and capable of large scale continuous treatment of highly toxic leachates.

It is another object of the invention to provide a leachate-treating system which is relatively inexpensive to operate.

With these and other objects in view, as will be apparent to those skilled in the art, the invention resides in the combination of elements and conditions set forth in the specification and covered by the claims appended hereto.

SUMMARY OF THE INVENTION

In general, the invention consists of a system for a method of treating effluent from refuse and in particular for treating the leachate issuing from the refuse.

Material which is brought into a landfill includes paper, garbage, vegetable debris, feces, metal and plastic products. The major source of water entering a landfill site is precipitation. The precipitation filters through the refuse and produces a highly toxic leachate made up of organic and inorganic molcules. Available oxygen is quickly used up and decomposition is primarily anaerobic. Without oxygen, metabolism by bacteria is of a fermentation type, with many forms of organic acids and alcohols being produced. Metals are reduced to their ionic state.

The invention consists of first providing a refuse basin for reception of refuse material which has a substantially water impervious liner covering the contour of the basin. Although any water impervious material may be used such as asphalt, concrete, and clay, it is preferred for economic reasons to utilize naturally occuring material, high in clay and containing silts and fines. The leachate from the refuse basin is directed into a catch basin adjacent to the refuse basin. A water impervious liner covers the inside contour of the basin. The purpose of the catch basin is to enable a continuous flow of leachate from the landfill to be drained off. The leachate is then conducted from the catch basin to a lagooning system consisting of at least one lagoon, although it is preferred that several lagoons be used. The lagoons are provided with a water impervious liner and provide treatment of the leachate in two or more stages.

In the first stage, the leachate is allowed to stand for a predetermined time period until the toxicity of the leachate has reached a level making it acceptable for treatment in the second stage. During this first stage, metals are precipiated from the leachate by oxidation. Stripping of volatile organic materials is a predominant activity. Pollutional strength of the leachate, at the beginning of this first state of treatment, is measured in terms of biochemical oxygen demand BOD5 and has a BOD5 of 20,000 to 30,000 mg/L. The BOD5 of the leachate at the end of the first stage is between 250 mg/L-300 mg/L. It is at this point that free oxygen begins to appear in the leachate to begin the second treatment stage.

The second stage of treatment begins by the introduction of aquatic plants, particularly from the plant family, Lemnaceae, in particular plants from the genus Lemna. Plants of this genus are particularly effective in absorbing heavy metals into their tissues, as well as providing oxygen as part of their natural metabolic activity. The oxygen produced by the plants accelerates the oxidation of remaining metals in the leachate and the organic substances. The plants, together with natural algae, and bacteria provide a primarily biological treatment of the leachate during this second stage. At the end of the second stage, the BOD5 of the leachate is less than 30 mg/L, and is acceptable for release to the environment.

In practice, leachate of this level of toxicity has been released into a trout pond with no adverse effect on the aquatic life in the pond.

It is preferred that separate lagoons be utilized for each stage of treatment to insure continuous treatment of leachate and in actual practice, four lagoons have been used, two for each stage which are filled and emptied on an alternate basis. A third stage may also be provided which includes separating the treated leachate at the end of the second stage from the aquatic plants. The plants, thus separated, may be disposed of or used to seed other lagooning systems.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
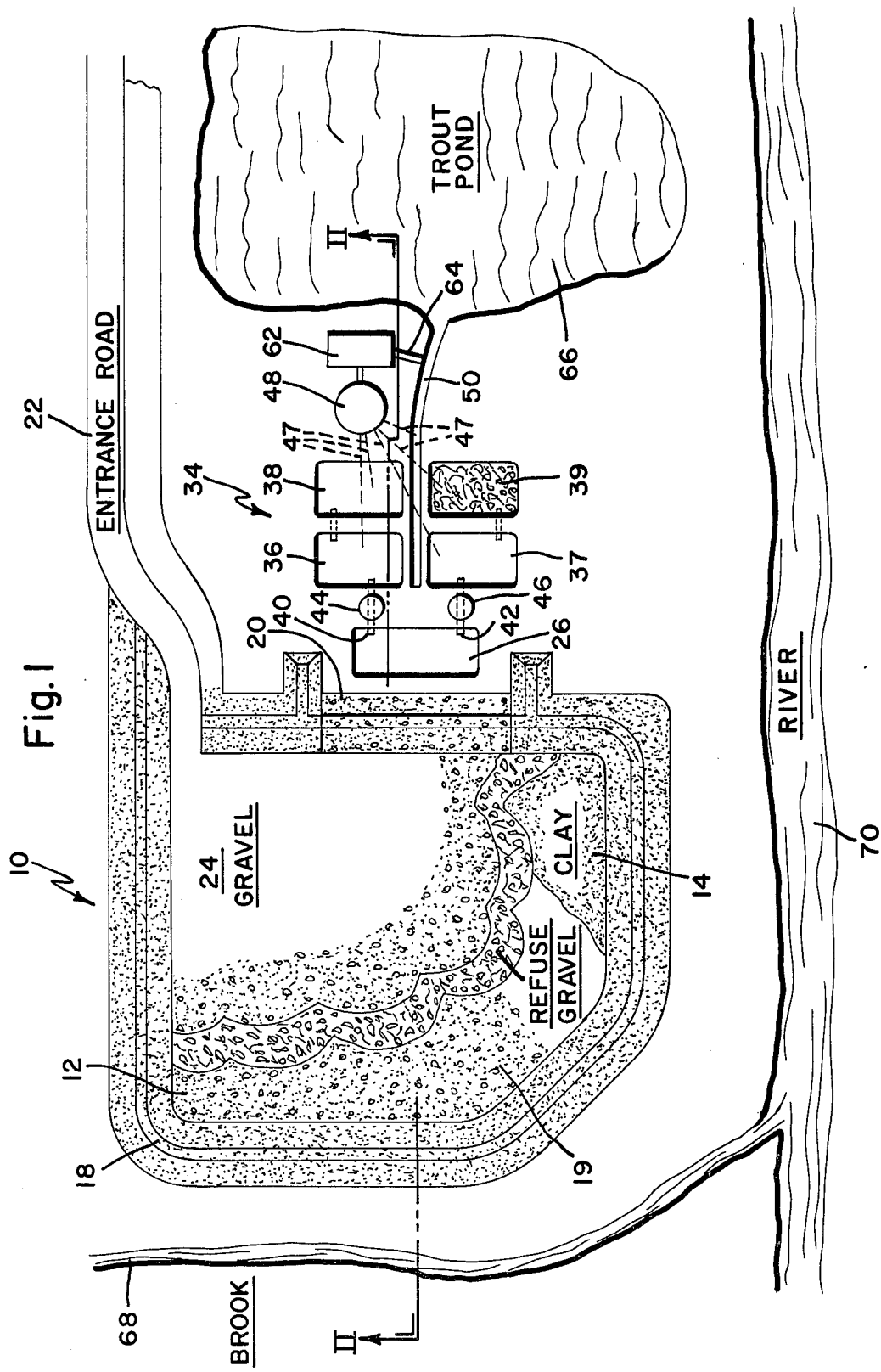
FIG. 1 is a plan view of an effluent treatment system constructed in accordance with the teachings of the present inventon.
Figure 2:
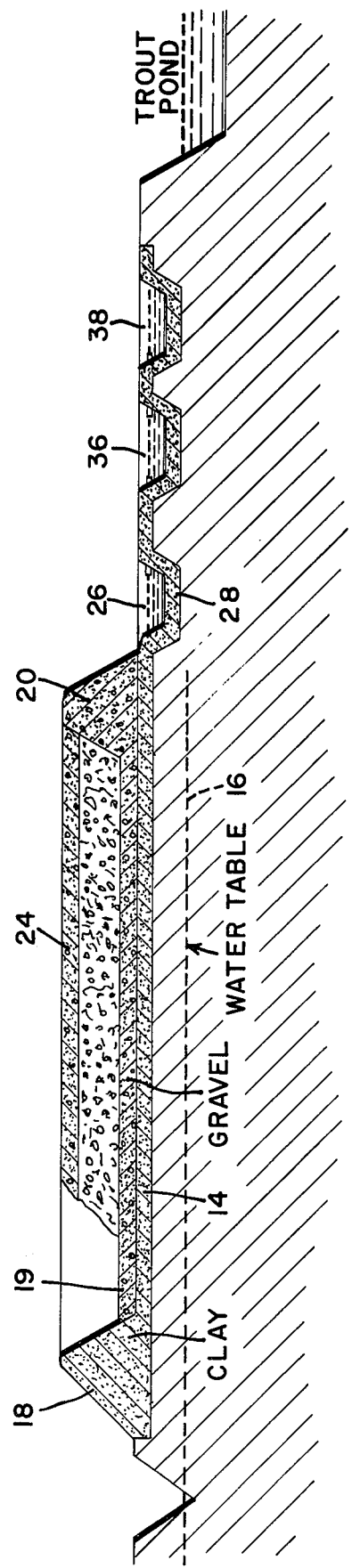
FIG. 2 is a cross-sectional view of the system in FIG. 1, taken along the line 2—2 of FIG. 1.

Referring first to FIGS. 1 and 2, the effluent treatment system of the present invention generally indicated by the reference numeral 10, is shown as having a basin 12 constructed of water-impervious material having a highpercentage of clay, silts and fines, sometimes referred to as "fragipan". The floor of the basin, material which is substantially indicated at 14, is composed of approximately four feet of "fragipan" and is located approximately four feet above the normal water table 16, shown in dotted lines. The walls 18 of the basin are also constructed of water-impervious material. The floor 14 of the basin is covered by a four-foot layer 18 of gravel. This layer of gravel extends to a dike 20 of water-permeable material such as gravel.

Refuse is trucked into the basin by means of an entrance road 22. After the refuse has been piled to a desired height, it is then covered with a layer of gravel 24. The entire basin slopes gradually toward the dike 20 from left to right, as shown in FIGS. 1 and 2, and is filled from the low side as shown in FIG. 1.

Figure 3:
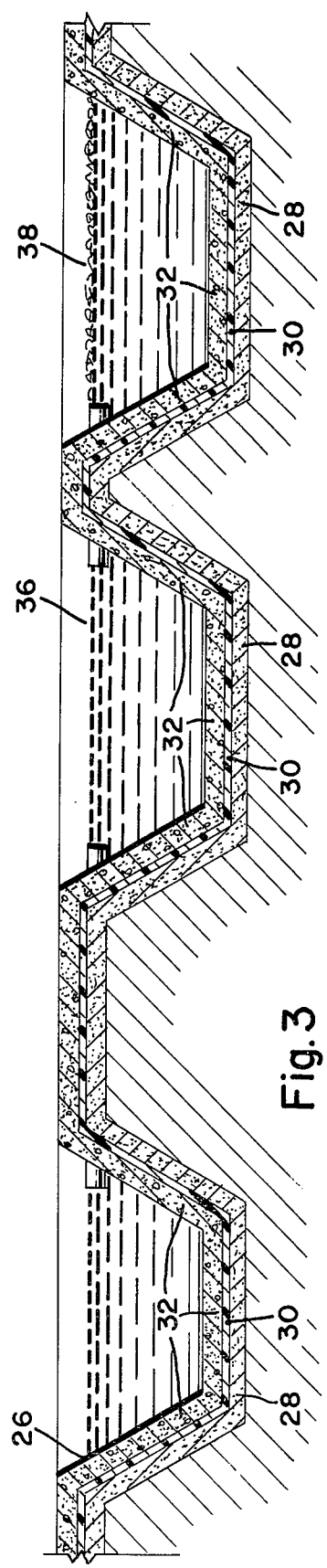
FIG. 3 is an enlarged sectional view of a portion of FIG. 2 showing the catch basin and lagoons.

After the refuse landfill 10 has been in operation for a period of time, precipitation water entering the basin filters through the refuse and leaches out through the dike 20 into a catch basin 26. The contour of the catch basin is water-impervious, being made up of a layer of clay material and lined with a plastic sheet. The layer of clay material is indicated by the reference numeral 28 and the plastic liner by the reference numeral 30 as shown in FIG. 3. It is also preferred that the plastic sheet be covered by a protective layer of gravel or a mixture of earth and crushed stone 32.

A lagooning system, generally indicated by the reference numeral 34, is located in front of the catch basin 26 and comprises first and second primary lagoons 38 and 39.

The basin 26 is selectively connected to first and second primary lagoons 36 and 37 by means of overflow pipes 40 and 42, respectively, which are controlled by valves 44 46, respectively. Lagoons 36 through 39 are all connected to appropriate piping indicated by dotted lines 47 to a central pumping station 48. This station is effective for transferring leachate, as a batch, from lagoon 36 to lagoon 38 and from lagoon 37 to lagoon 39, and for transferring leachate from lagoons 38 and 39 to a discharge trench 50. The leachate may also be transferred from the primary lagoons to the secondary lagoons by means of siphoning or portable pump. It is also possible to terrace the lagoons so that the secondary lagoons are at a lower level than the primary lagoons and at a higher level than trench 50. In this case, the leachate may be transferred from the primary lagoon to the secondary lagoons and then to the discharge trench 50 by means of overflow piping and appropriate valves associated with the piping. As shown in FIG. 3, the layers of clay material 28 and plastic sheet 30 extend to the lagoons 36 through 39, so that they are also water impervious.

Figure 4:
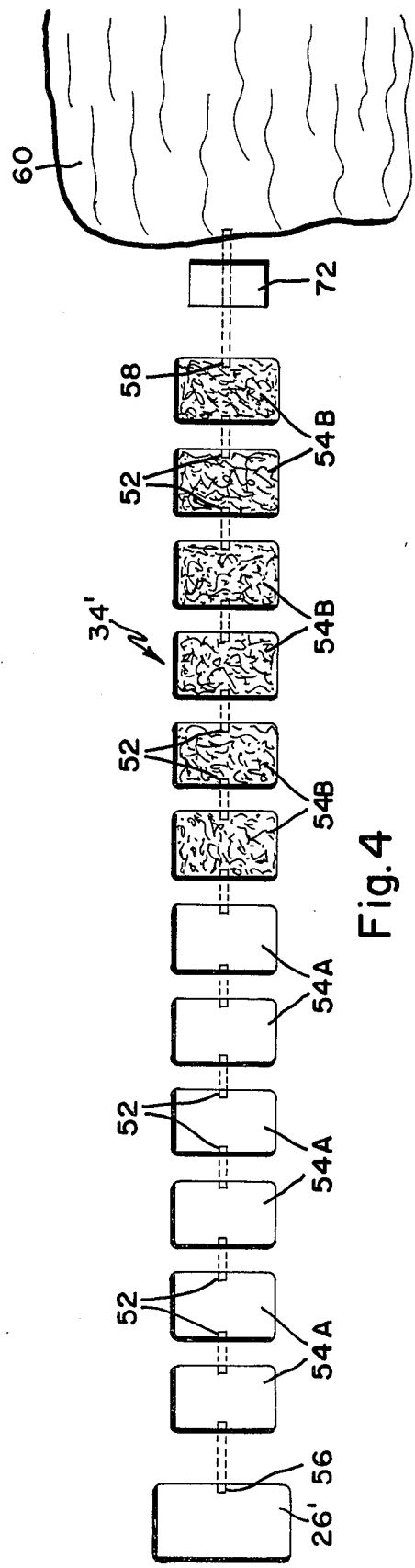
FIG. 4 is a diagrammatic view of a modified form of the lagooning system.

FIG. 4 represents a modification in which the lagooning system is generally indicated by the reference numeral 34'. The lagoons in this system are similar to lagoons 36 through 39 shown in FIG. 1, except that they are arranged in series and connected by means of overflow pipes 52. The lagoons are divided into two groups, 54A and 54B. In this embodiment, leachate is collected in a catch basin 26' from the refuse basin in much the same manner as basin 26 and this leachate is directed to the first lagoon 54A by means of an overflow pipe 56. The leachate then proceeds from lagoon to lagoon by means of overflow pipes 52 so that there is a continuous flow of leachate. The leachate in lagoons 54A represent the first treating stage and the lagoon 54B represents the second treating stage. The treated leachate from the last lagoon 54B is then discharged through an overflow pipe 58 into a natural body of water, such as pond 60.

GENERAL OPERATION

In the preferred embodiment shown in FIGS. 1-3, the leachate collected in catch basin 26 from the refuse basin is in an extremely toxic state. It has high levels of metal in the ionic state, such as iron, manganese, zinc, copper, cadmium, mercury, chromium, sillinium, arsenic, etc. It also has a high degree of chlorides, ammonia, sulphates. The alkalinity, measured in terms of mg/L of calcium carbonate, is very high and the PH is low. The biochemical oxygen demand, or BOD5, is extremely high, in the neighborhood of 20,000 to 30,000 mg/L and there is, of course, no dissolved free oxygen.

At the beginning of a treating operation it is assumed that all of the lagoons are empty and that catch basin 26 is being filled from the refuse basin. When catch basin 26 is filled to capacity, valve 44 is opened and leachate flows through overflow pipe 40 into the first primary lagoon 36. When lagoon 36 has been filled to the desired level, no more than three feet, valve 44 is shut off and valve 46 is opened to divert the flow of leachate from catch basin 26 into lagoon 37. Natural aeration occurs as the leachate flows into the primary lagoon 36 and continues to occur after the lagoon as been filled and allowed to stand for a period of time. The organic materials and nutrients in the leachate are consumed by the aerobic bacteria, which create a considerable demand for oxygen. This oxygen is continuously drawn into the system from the atmosphere and produced in some degree by natural algae and other natural plant life in the leachate. The metallic ions are also oxidized during this stage, creating even further demands for oxygen.

The relative shallowness of the lagoon insures that the system remains aerobic or aseptic. The metabolic by-products of the bacteria involved are mostly carbon dioxide and water. The carbon dioxide and other organic gases escape into the atmosphere during this stage.

After a period of time, much of the metallic ions are oxidized into various salts and much of the organic matter is consumed by the aerobic bacteria. The first stage of treatment ends when the BOD5 reaches a point below 300 mg/L and free dissolved oxygen begins to appear in the leachate. Also, at the end of this first stage, the alkalinity, as mg/L of calcium carbonate is substantially reduced and the pH is increased from approximately 5.5 to 6.5. It is at this point, that the leachate is pumped from the first primary lagoon 36 into the secondary lagoon 38 where the second stage of treatments begins. The lagoons are sufficiently large so that the first stage of treatment is completed in lagoon 36 substantially before the second primary lagoon has filled. Once lagoon 37 has been filled to the desired depth of three feet or less, valve 46 is shut off and valve 44 is opened to divert the flow of leachate into first primary lagoon 36. In this manner, flow of leachate from the catch basin 26 is continuous while the treatment time for each batch of leachate during the first stage can be controlled to an absolute degree.

The leachate, which is transferred from the first primary lagoon 36 to its corresponding secondary lagoon 38, is sufficiently reduced in toxicity for the introduction of aquatic plant life to begin the second stage of treatment for leachate. The plant life is of a type which is sensitive to the high toxicity represented by the leachate in the first stage of treatment, but tolerant of the relatively lower toxicity of the leachate in the second stage of treatment. A great amount of success has been achieved by the use of plants from the family Lemnacea and particularly the genus Lemna. This plant life thrives in the leachate because of the large amount of nutrients remaining in the leachate. As the plant life grows, it releases an additional amount of oxygen into the leachate, which accelerates the action of the aerobic bacteria, and further accelerates oxidation of the ionic metals remaining in the leachate. The depth of the leachate in lagoon 38 during the second stage of treatment is preferrably kept at three feet or less to prevent anaerobic processes from taking place. At the end of this second stage of treatment, the ionic metal content is substantially reduced, the alkalinity is at a very low level and the BOD5 is reduced to a level of 30 mg/L or less. In some cases, the BOD5 level has been reduced to as much as less than 5 mg/L and the dissolved oxygen measured at 10 mg/1. The pH does not change substantially and it appears to increase somewhat from that of the leachate in the first stage of treatment.

At the end of the second stage of treatment, the leachate is pumped from the secondary lagoon 38 and discharged directly into trench 50 or diverted through a filtering means 62 to separate whatever plant life may have been pumped up from the secondary lagoon. The filtered leachate is then discharged into the trench 50 from a pipe 64. When the treated leachate is pumpepd from the secondary lagoon 38, much of the plant life in the lagoon simply sinks, as a mat, to the bottom of the lagoon and is in readiness to receive the second batch of leachate from the first primary lagoon 36. Filtering the leachate through sand filters has been found to be effective in separating the leachate from plant life taken up from the secondary lagoon.

The leachate discharged into trench 50 flows into a trout pond 66. Although leachate, having a BOD5 of 30 mg/L is, in itself, too toxic for normally sensitive fish, such as trout, the diluting effect of water entering the pond from other sources maintains the BOD5 level of the water in the pond at a sufficiently low level to enable trout to thrive.

By using the system of effluent treatment shown graphically in FIG. 1, together with the process described above, a highly toxic effluent, having a high potential for environmental contamination, is neutralized to a harmless state with respect to the surrounding environment. In an actual test site, a brook 68 was located on one side of the refuse basin and a river 70 on another side. During operation of the system there was no contamination of either of these natural bodies of water.

In the modification shown in FIG. 4, highly toxic leachate from catch basin 26' flows into the series of lagoons 34'. As the leachate flows through the series of lagoons, its toxicity is reduced as it passes from each lagoon in the series. The first group of lagoons 54A represents the first stage of leachate treatment. The size and number of lagoons used in the first stage of treatment depends on factors such as the overall size of the landfill site and amount of rainfall in the geographic location of the site. The depth of leachate in each lagoon is kept at three feet or less, as in the preferred embodiment and the toxicity of the leachate in each lagoon is reduced to the point where the toxicity in the last lagoon 54A is approximately the same as that of the leachate at the end of the first stage of treatment in lagoon 36 or 37. The toxicity of the leachate, having been sufficiently reduced as the leachate passes from the last lagoon 54A to the first lagoon 54B, aquatic plants of the same type used in the preferred embodiment are introduced into lagoons 54B, which represent the second stage of treatment.

As the leachate passes from the first lagoon 54B through the series of lagoons to the last lagoon 54B, the toxicity of the leachate drops progressively. By the time the leachate reaches the last lagoon 54B, it is in approximately the same condition as the leachate at the end of the second stage of treatment in lagoons 38 or 39 in the preferred embodiment. At this point, the leachate from the last lagoon 54B may be discharged directly into pond 60 or it may pass through a filtering means 72 similar to filtering means 62. The lagooning system shown in FIG. 4 represents a continuous flow system as opposed to the batch system shown in FIGS. 1 through 3. The batch system has the advantage in that the treating periods may be exactly controlled regardless of flow rate while the continuous flow system has to be designed to accommodate the maximum flow condition and requires more space. However, the continuous flow system has the advantage in that there is greater aeration due to the continuous flow of leachate and a larger exposed surface area of leachate in the lagoons.

The system described in the present application represent an efficient economical and effective system for refuse areas having sufficient land. In cases where land costs are high or land area is limited, the systems described herein could be further modified by providing aeration equipment in the primary lagoons to reduce the first stage treatment period for a given lagoon area, thereby allowing smaller lagoons to be used.

Although the catch basin in the present application is depicted as a simple depression for accumulating the leachate, it could also serve as pre-treatment station. As described herein, the catch basin functions as an extension of the primary lagoons since the aerobic processes associated with the first stage of treatment begins as soon as the leachate enters the catch basin. Treatment units could be employed in place of the catch basin which would function as a catch basin and as pretreatment to reduce the BOD5 value of the leachate transferred to the primary lagoons, thereby reducing the treatment time and or space requirements. Various types of treatment units may be employed, as for example, "fluidized beds" or "fixed film reactors" operated anaerobically to produce methane gas as a by-product.

The catch basin may be eliminated completely by replacing the gravel filter dike with impervious material. In this form, the refuse fill area is water tight on all sides and bottom. Leachate Is removed via manholes in the bottom that are piped to the outside through the base of the dike. Anaerobic leachate thus removed can be discharged in a controlled manner to the first stage lagoon, or to a digestion unit for methane production. The utilization of a fluidized bed digester greatly reduces normal digester detention time, and the value of methane gas produced can be used to offset other treatment costs.

The dike disclosed in this application also represents an efficient and effective means of conveying leachate to the catch basin but it is contemplated that drains could be provided beneath the gravel bed below the refuse. The drains could also be connected to the catch basin or pre-treatment plant by appropriate piping.

It is obvious that minor changes may be made in the form and construction of the invention without departing from the material spirit thereof. It is not, however, desired to confine the invention to the exact form herein shown and described, but it is desired to include such as all properly come within the scope claimed.

The invention having been thus described, what is claimed as new and desired to secure by Letters Patent is:

1. System for treating leachate effluent from refuse, comprising:
   (a) a refuse basin for the reception of refuse material,
   (b) a liner of substantially water-impervious material covering the inside contours of the basin,
   (c) a water-impervious catch basin adjacent the refuse basin and located at a lower level than the refuse basin,
   (d) means forming part of said refuse basin for allowing leachate to drain from the refuse basin to the catch basin, the means for allowing leachate to drain from the refuse basin to the catch basin comprising a water-permeable dike along one side of the refuse basin in direct contact with the refuse in the basin and an extension of water-impervious materials sloping downwardly from the bottom of the dike to the catch basin,
   (e) water impervious first and secondary primary lagoons for effecting a primary treatment of refuse leachate,
   (g) primary flow control means for selectively conveying leachate accumulated in said catch basin to said first and second lagoons, whereby a quantity of leachate may be treated in one of said primary lagoons while leachate is being conveyed to the other of said primary lagoons, and
   (h) secondary flow control means for transferring leachate from each primary lagoons to each of secondary lagoons.

2. The system as recited in claim 1, wherein the catch basin is an excavation in the earth and the inside contour of the excavation is provided with a liner of a water-impervious material.

3. The system as recited in claim 2, wherein the liners for the catch basin and the lagoon consists of an earthen material containing a substantial amount of clay.

4. The system as recited in claim 2, wherein the liners for the catch basin and the lagoon each comprise a plastic sheet.

5. The system as recited in claim 4, wherein each plastic sheet is covered with a protective layer of particulate material.

6. The system as recited in claim 5, wherein the particulate material is gravel.

7. The system as recited in claim 1, wherein the water-impervious liner of the refuse basin is an earthen material containing a substantial amount of clay.

8. The system as recited in claim 7, wherein the thickness of the layer of earthen material is approximately four feet.

9. The system as recited in claim 1, wherein there is a layer of water-permeable material between the liner in the refuse basin and the refuse.

10. The system as recited in claim 9, wherein the refuse basin liner is clay and the layer of water-permeable material in the refuse basin is gravel.

11. The system as recited in claim 10, wherein the thickness of the refuse basin liner is approximately four feet and the thickness of the gravel in the refuse basin is approximately four feet.

12. The system as recited in claim 1, wherein said primary flow control means comprises:
   (a) overflow piping connecting the catch basin to the first and second primary lagoons, and
   (b) valving associated with said overflow piping for selectively shutting off and opening the flow of leachate to the first and second primary lagoons.

* * * * *